United States Patent
Ichinokawa

(10) Patent No.: US 6,714,737 B2
(45) Date of Patent: Mar. 30, 2004

(54) PARALLAX CORRECTING APPARATUS OF A VIEWFINDER

(75) Inventor: Kazuhiro Ichinokawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/155,989

(22) Filed: May 29, 2002

(65) Prior Publication Data

US 2002/0181954 A1 Dec. 5, 2002

(30) Foreign Application Priority Data

May 30, 2001 (JP) ........................................ 2001-162005

(51) Int. Cl.[7] ............................................... G03B 13/14
(52) U.S. Cl. ....................................................... 396/377
(58) Field of Search ................................. 396/373, 377

(56) References Cited

U.S. PATENT DOCUMENTS

| | | | |
|---|---|---|---|
| 4,432,626 A | * | 2/1984 | Ohtake ........................ 396/377 |
| 4,924,247 A | | 5/1990 | Suzuki et al. |
| 5,142,312 A | | 8/1992 | Suzuki et al. |
| 5,345,287 A | | 9/1994 | Taguchi |
| 5,463,438 A | | 10/1995 | Kosako |
| 5,563,671 A | | 10/1996 | Inazuka |
| 5,585,965 A | * | 12/1996 | Hayashi et al. ............. 359/431 |

* cited by examiner

*Primary Examiner*—David Gray
(74) *Attorney, Agent, or Firm*—Greenblum & Bernstein, P.L.C.

(57) ABSTRACT

A parallax correcting apparatus includes a finder block mounted on a stationary base; a pivotal projection and a pivotal recess which are formed on the finder block and the stationary base, a common axis thereof being perpendicular to an optical axis of the viewfinder; a first adjustment mechanism for rotating the finder block about the common axis; a pair of vertical position adjustment mounts formed on the stationary base on opposite sides of the common axis in a front and rear direction; a second adjustment mechanism for adjusting a height of one of the pair of vertical position adjustment mounts; a pair of fixing mounts formed on the stationary base on opposite sides of the common axis in a right and left direction; and a pair of fixing limbs formed on the finder block which are fixed to the pair of fixing mounts, respectively, after adjustment.

9 Claims, 3 Drawing Sheets

PARALLAX CORRECTING APPARATUS OF A VIEWFINDER

BACKGROUND OF THE INVENTION

1. Field of the Invention

The present invention relates to a parallax correcting apparatus of a viewfinder which can be incorporated in a camera such as a compact camera using silver halide film, or a digital camera.

2. Description of the Related Art

In a manufacturing process for cameras such as compact cameras or digital cameras in which a photographing optical system and a viewfinder optical system are independent of each other, parallax correction is generally carried out to correct a difference between the image taken in by the viewfinder optical system and the image taken in by the photographing optical system, i.e., in order to correct a parallax occurring between the optical axis of the viewfinder and the optical axis of the photographing optical system.

As an example of a conventional parallax correcting apparatus, a parallax correcting apparatus in which the position (or angle) of at least one optical element among a plurality of optical elements (e.g., lens elements or mirrors), provided in a box-shaped hollow finder block, is constructed so as to be adjustable for parallax correction, is known in the art.

However, it is becoming increasingly difficult to adjust the position or angle of one or more adjustable optical elements in the finder block because the finder block, the adjustable optical element, and the camera which includes the finder block and the adjustable optical element, have been further miniaturized in recent years.

Due to such difficulty, for instance, the adjustable optical element and the finder block may come in contact with each other to thereby form scratches thereon during a parallax correcting operation.

Furthermore, foreign particles such as fine dust may enter into the finder block during the parallax correcting operation to thereby deteriorate the performance of the viewfinder.

SUMMARY OF THE INVENTION

The present invention provides a parallax correcting apparatus of a viewfinder, which is structured so that scratches are not made on either the finder block or the adjustable optical element in the finder block during the parallax correcting operation, and so that foreign particles such as dust do not enter into the finder block during a parallax correcting operation.

For example, a parallax correcting apparatus of a viewfinder of a camera is provided, including a finder block which accommodates all optical elements of the viewfinder; a stationary base which is integral with the camera body, the finder block being mounted on the stationary base; a pivotal projection and a pivotal recess which are formed on one and the other of the finder block and the stationary base, so that the finder block is rotatably engaged with the stationary base via the pivotal projection and the pivotal recess to allow the finder block to rotate relative to the stationary base, a common axis of the pivotal projection and the pivotal recess being perpendicular to an optical axis of the viewfinder; a first adjustment mechanism for rotating the finder block about the common axis; a pair of vertical position adjustment mounts formed on the stationary base on opposite sides of the common axis in a front and rear direction of the camera; a second adjustment mechanism for adjusting a height of one of the pair of vertical position adjustment mounts with respect to a height of the other of the pair of vertical position adjustment mounts which serves as a reference height; a pair of fixing mounts formed on the stationary base on opposite sides of the common axis in a right and left direction of the camera; and a pair of fixing limbs formed on the finder block which are fixed to the pair of fixing mounts, respectively, after the orientation of the finder block is adjusted via the first adjustment mechanism and the second adjustment mechanism.

The first adjustment mechanism can include an elongated hole formed on one of the pair of fixing limbs, the elongated hole being elongated in a radial direction from the common axis of the pivotal projection and the pivotal recess; a pivotal hole formed on the stationary base, the pivotal hole corresponding with the elongated hole; and an adjustment jig including a pivotal shank portion and an eccentric shank portion which are engaged in the pivotal hole and the elongated hole, respectively, an axis of the eccentric shank portion being eccentric to an axis of the pivotal shank portion.

One of the vertical position adjustment mounts can serve as a reference mount, and the other of the vertical position adjustment mounts can serve as an adjustment mount having a height smaller than a height of the reference mount. The second adjustment mechanism includes a plurality of spacers of different thicknesses, a spacer being selected from among the plurality of spacers to be inserted between the adjustment mount and the finder block.

The parallax adjusting mechanism can further include a pivotal mount formed on the stationary base, the pivotal recess being formed on the pivotal mount. Furthermore, the height of the reference mount is greater than that of the adjustment mount, the height of the adjustment mount is greater than that of each of the pair of fixing mounts, and the height of each of the pair of fixing mounts is greater than that of the pivotal mount.

It is desirable for the heights of the pair of fixing mounts to be the same.

The parallax adjusting mechanism can further include an adjustment jig support mount formed on the stationary base, wherein the pivotal hole, in which the pivotal shank portion of the adjustment jig is engaged, is formed on the adjustment jig support mount.

It is desirable for the heights of the pivotal mount and the adjustment jig support mount to be the same.

The pair of fixing limbs can be respectively fixed to the pair of fixing mounts by set screws.

The finder block can include a channel member and a top cover 15 which covers the top of the channel member, wherein the pivotal projection or the pivotal recess is formed on a bottom surface of the channel member.

The present disclosure relates to subject matter contained in Japanese Patent Applications No. 2001-162005 (filed on May 30, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 4:
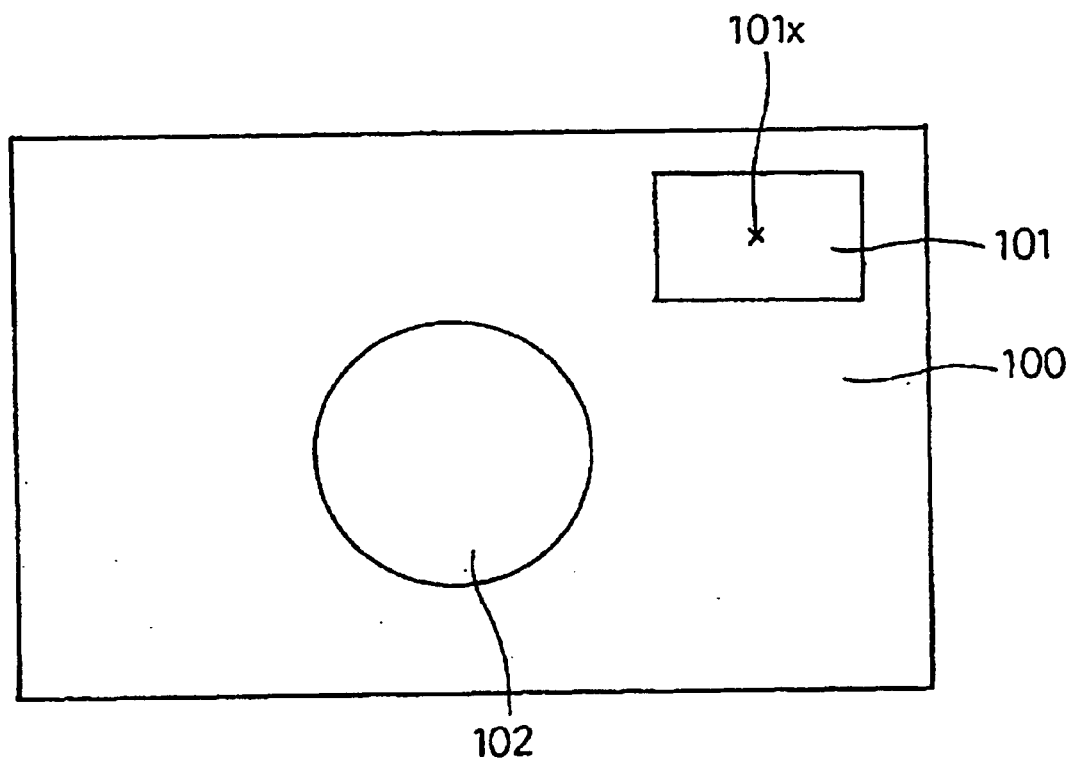
FIG. 4 is a schematic front elevational view of a compact camera in which the parallax correcting apparatus shown in FIG. 1 is incorporated.

FIG. 4 shows a compact camera 100 having a viewfinder 101 provided with an embodiment of a parallax correcting apparatus according to the present invention. The camera 100 is provided with a photographing lens system 102 which is independent of the optical system of the viewfinder 101, so that the optical axis of the photographing lens system is different from that of the viewfinder optical system. The terms "front" and "rear" used in the following descriptions indicate the front and the rear of the camera 100 (the viewfinder 101), respectively.

Figure 1:
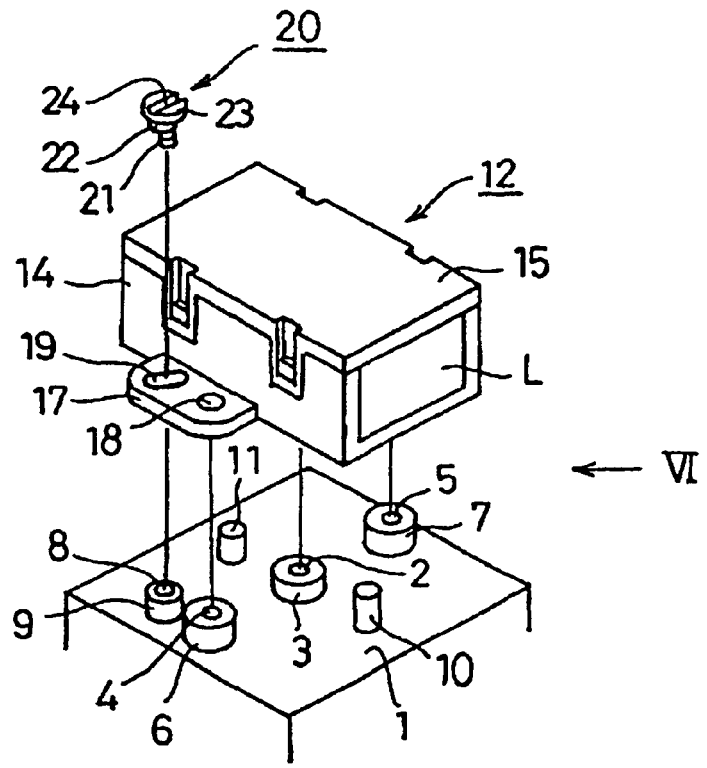
FIG. 1 is an exploded perspective view of an embodiment of a parallax correcting apparatus, showing a state before a finder block is secured to a pair of fixing mounts.
Figure 2:
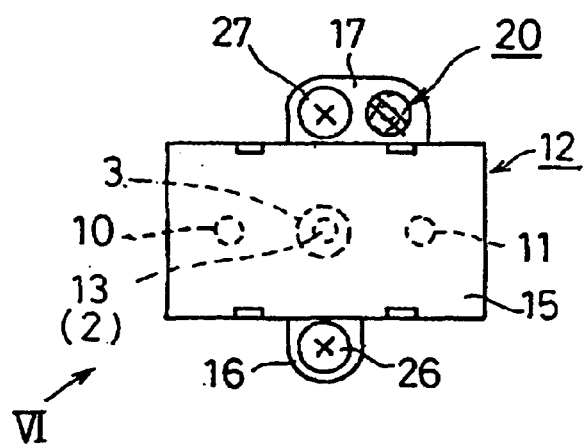
FIG. 2 is a plan view of the finder block shown in FIG. 1.
Figure 3:
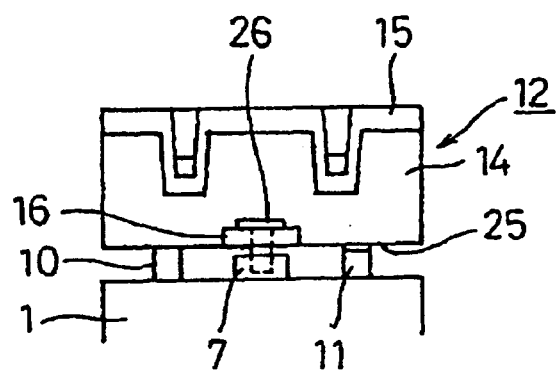
FIG. 3 is a side elevational view of the parallax correcting apparatus shown in FIG. 1.

The camera 100 includes a base (stationary base) 1 which is provided in an internal portion of the camera body (see FIGS. 1 through 3). The base 1 is provided, at the center of a top surface thereof, with a pivotal mount 3. The pivotal mount 3 is provided at the center thereof with a support hole (pivotal recess) 2 which extends in the vertical direction of the camera 100. The base 1 is provided on right and left sides of the pivotal mount 3 with right and left fixing mounts (pair of fixing mounts) 6 and 7, respectively. The right fixing mount 6 is provided at the center thereof with a screw hole 4 which extends in the vertical direction of the camera 100. Likewise, the left fixing mount 7 is provided at the center thereof with a screw hole 5 which extends in the vertical direction of the camera 100.

The base 1 is provided on the top surface thereof behind the right fixing mount 6 with an adjustment jig support mount 9. The adjustment jig support mount 9 is provided at the center thereof with a support hole (pivotal hole) 8 which extends in the vertical direction of the camera 100.

The base 1 is provided on the top surface thereof in front of the pivotal mount 3 with a reference mount (vertical position adjustment mount) 10, and is further provided on the top surface of the base 1 behind the pivotal mount 3 with a vertical position adjustment mount 11.

Figure 6:
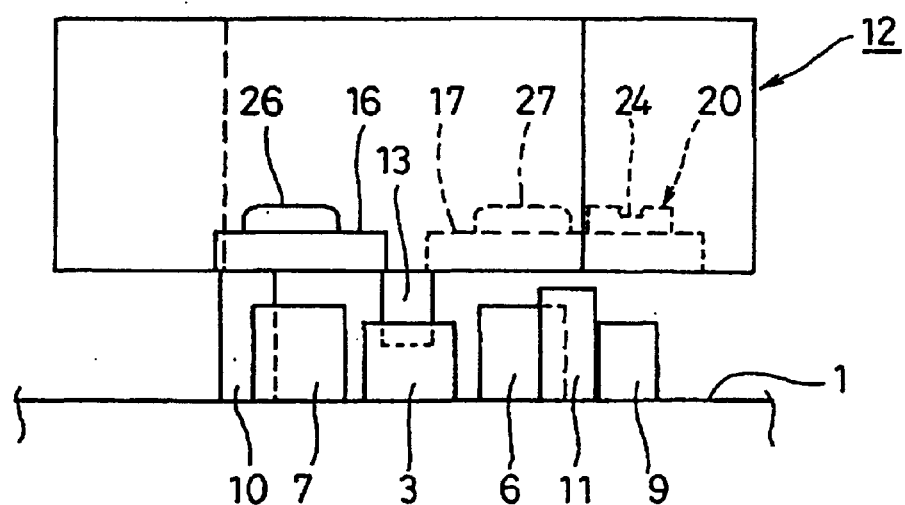
FIG. 6 is an elevation of the parallax correcting apparatus of FIG. 1, as viewed in the direction VI shown in FIGS. 1 and 2.

As can be understood from FIG. 6, the respective heights of the pivotal mount 3, the right and left fixing mounts 6 and 7, the adjustment jig support mount 9, the reference mount 10 and the vertical position adjusting mount 11 are not the same; the decreasing order of height of these elements is (1) the reference mount 10, (2) the vertical position adjusting mount 11, (3) the right and left fixing mounts 6 and 7, and (4) the pivotal mount 3 and the adjustment jig support mount 9. The heights of the right and left fixing mounts 6 and 7 are the same, while the heights of the pivotal mount 3 and the adjustment jig support mount 9 are the same. The various heights of the above described elements which are shown in FIG. 6 are exaggerated for clarity. Note that the height of the vertical position adjusting mount 11 is greater than the height of each of the right and left fixing mounts 6 and 7 (see FIG. 3). Although a central portion of the bottom surface of a channel member 14 in a front and rear direction (the horizontal direction as viewed in each of FIGS. 2 and 3) is slightly curved downwards, the bottom surface of the channel member 14 is shown flat by a straight line in FIG. 3, because the degree of the curvature thereof is very small.

The viewfinder 101 is provided with a finder block 12. The finder block 12 includes the channel member 14 and a top cover 15. The channel member 14 is provided at the center of a bottom surface thereof with a pivot (pivotal projection) 13 (see FIG. 2) which is rotatably engaged in the support hole 2 of the pivotal mount 3. The top of the channel member 14 is covered by the top cover 15. All of the optical elements (e.g., a plurality of lens groups, and at least one mirror or prism as necessary) of the viewfinder 101 are accommodated in the finder block 12. Such optical elements define the optical axis 101X (see FIG. 4) of the viewfinder 101. The position of the optical axis 101X relative to the finder block 12 remains unchanged. In FIG. 1 only a frontmost lens element L of the viewfinder 101 among all the optical elements thereof is shown.

The channel member 14 is provided on left and right sides thereof with a pair of fixing limbs 16 and 17, respectively, which extend horizontally so that the bottom surfaces thereof are flush with the bottom surface of the channel member 14.

The left limb 16 is provided with a through-hole (not shown) formed to correspond to the screw hole 5 of the left fixing mount 7, while the right limb 17 is provided with a through-hole 18 formed to correspond to the screw hole 4 of the right fixing mount 6. The diameter of the through-hole of each of the two fixing limbs 16 and 17 is slightly greater than the diameter of the corresponding screw hole 4 and 5. The right fixing limb 17 is further provided with an elongated through-hole 19 formed to correspond to the support hole 8 of the adjustment jig support mount 9. The elongated through-hole 19 is elongated in a radial direction from the pivotal mount 3.

The fixing operation for fixing the finder block 12 to the base 1 and the parallax correcting operation for correcting parallax between the optical axis of the viewfinder 101 and the optical axis of the photographing optical system 102 will be hereinafter discussed.

Firstly, the finder block 12 is mounted on the base 1 with the pivot 13 being inserted into the support hole 2 of the pivotal mount 3 from the top thereof.

Figure 5:
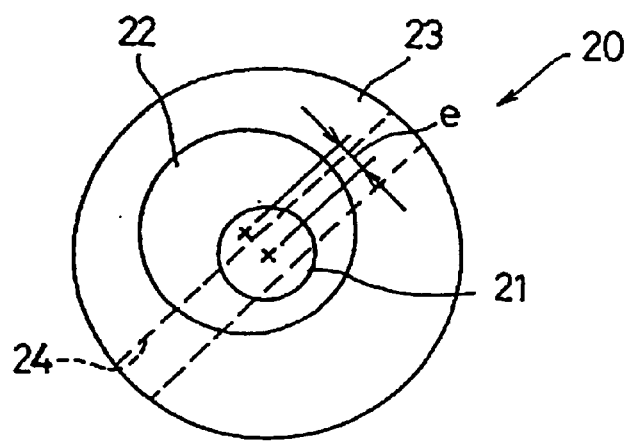
FIG. 5 is a underside view of a screw-like adjustment jig which is utilized for carrying out parallax correction.

Subsequently, the orientation of the finder block 12 in a right and left direction thereof is adjusted using a screw-like adjustment jig 20 (see FIGS. 1, 2 and 5).

The adjustment jig 20 is provided with a slotted head 23, an eccentric shank portion 22 and a shank end portion (pivotal shank portion) 21, in that order from the upper end to the lower end thereof. A slot 24 is formed on the slotted head 23. The shank end portion 21 can be rotatably fitted in the support hole 8 of the adjustment jig support mount 9. The eccentric shank portion 22 can be engaged in the elongated through-hole 19, and has a diameter greater than that of the shank end portion 21. The axis of the eccentric shank portion 22 is eccentric to the axis of the shank end portion 21 as shown in FIG. 5. The slotted head 23 has a diameter greater than the diameter of the eccentric shank portion 22, and has an axis coaxial to the axis of the shank end portion 21.

The shank end portion 21 is inserted into the support hole 8 through the elongated through-hole 19, and at the same time, the eccentric shank portion 22 is inserted into the elongated through-hole 19. Thereafter, the orientation of the finder block 12 is adjusted by turning the adjustment jig 20 with a flatblade screwdriver (not shown) with the blade thereof being engaged in the slot 24. This causes the eccentric shank portion 22 to rotate while the outer surface thereof pushes the inner surface of the elongated through-hole 19 to thereby rotate the finder block 12 clockwise and counterclockwise within a predetermined range. This rotational movement of the finder block 12 makes it possible to adjust the orientation of the finder block 12 in the right and left direction thereof. Sufficient adjustment can be carried out if the finder block 12 can rotate in a range of approximately one to two degrees. The amount of eccentricity of the eccentric shank portion 22 with respect to the shank end portion 21 is determined so as to allow such adjustment to be carried out in the range of approximately one to two degrees.

The adjustment jig 20, the elongated through-hole 19 and the support hole 8 are fundamental elements of a first adjustment mechanism for rotating the finder block 12 about the axis of the pivot 13 which extends perpendicular to the optical axis 101X of said viewfinder.

Thereafter, an appropriate spacer 25 is selected from among a plurality of spacers 25 of different thicknesses (only one is shown in FIG. 3), and is inserted between the top surface of the vertical position adjustment mount 11 (the height thereof being smaller than the height of the reference mount 10) and the bottom surface of the channel member 14 to adjust the orientation of the finder block 12 in the vertical direction thereof. The plurality of spacers 25 that are prepared in advance include a reference spacer whose thickness is determined so that the sum of the thickness of the reference spacer and the height of the vertical position adjustment mount 11 is the same as the height of the reference mount 10, a plurality of thick spacers of different thicknesses which are each greater than the thickness of the reference spacer, and a plurality of thin spacers of different thicknesses which are each smaller than the thickness of the reference spacer. When the parallax cannot be corrected properly in the vertical direction of the camera 100 with the use of the reference spacer, a spacer having an appropriate thickness is selected from the plurality of thick spacers or the plurality of thin spacers, and is inserted between the top surface of the vertical position adjustment mount 11 and the bottom surface of the channel member 14. It is sufficient for this adjustment if the finder block 12 can tilt with respect to the top surface of the base 1 in a range of approximately one to two degrees, similar to the range of rotation of the finder block 12 about the pivot 13. Therefore, the plurality of spacers 25 of different thicknesses are prepared in advance to make it possible to carry out such an adjustment in the range of approximately one to two degrees.

The plurality of spacers 25 are fundamental elements of a second adjustment mechanism for adjusting the height of the vertical position adjustment mount 11 with respect to the reference mount 10.

When the field of view of the finder block 12 coincides with the photographic frame (picture frame) of the photographing lens system 102 as a result of both the above described adjusting operations in which the orientation of the finder block 12 in the right and left direction thereof is adjusted and the orientation of the finder block 12 in the vertical direction thereof is adjusted, a set screw 27 is screwed into the screw hole 4 through the through-hole 18 on the right limb 17 while a set screw 26 is screwed into the screw hole 5 through the through-hole formed on the left limb 16 to fix the finder block 12 to the base 1.

As can be understood from the above description, according to the present embodiment of the parallax correcting apparatus, unlike a conventional parallax correcting apparatus, scratches are not made on the optical elements accommodated in the finder block 12 during the parallax correcting operation because the orientation of the entire finder block 12 that accommodates all the optical elements of the viewfinder 101 is adjusted in the right and left direction thereof and the vertical direction thereof.

The channel member 14 and the top cover 15 can be engaged with each other in a sealed fashion, while the front and rear openings of the finder block 12 can be tightly closed by the frontmost lens element L and a rearmost lens element (not shown) of the optical elements accommodated in the finder block 12, respectively. This sealed structure of the finder block 12 prevents foreign particles such as fine dust from entering the finder block 12. Accordingly, the performance of the viewfinder does not deteriorate due to such foreign particles.

Although the screw-like adjustment jig 20 remains engaged in the elongated through-hole 19 and the support hole 8 even after the parallax correcting operation is completed in the above illustrated embodiment, the screw-like adjustment jig 20 can be removed from the elongated through-hole 19 and the support hole 8 after the finder block is fixed to the base 1 by the set screws 26 and 27 since the adjustment jig 20 is no longer necessary after the finder block is fixed to the base 1.

Although the pivot 13 is formed on the bottom of the channel member 14 while the support hole 2 in which the pivot 13 is rotatably engaged is formed on the base 1 in the above illustrated embodiment, a pivot corresponding to the pivot 13 and a support hole corresponding to the support hole 2 can be formed on the base 1 and the channel member 14, respectively.

The compact camera 100 can be either a lens-shutter type of camera using sensitive film, or a digital camera using an electronic image pick-up device.

As can be understood from the above description, a parallax correcting apparatus of a viewfinder which is structured so that scratches are not made on either the finder block or the adjustable optical element during the parallax correcting operation, and so that no foreign particle such as dust enters the finder block during the parallax correcting operation, is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A parallax correcting apparatus of a viewfinder of a camera, comprising:

a finder block which accommodates all optical elements of said viewfinder;

a stationary base which is integral with the camera body, said finder block being mounted on said stationary base;

a pivotal projection and a pivotal recess which are formed on one and the other of said finder block and said stationary base, so that said finder block is rotatably engaged with said stationary base via said pivotal projection and said pivotal recess to allow said finder block to rotate relative to said stationary base, a common axis of said pivotal projection and said pivotal recess being perpendicular to an optical axis of said viewfinder;

a first adjustment mechanism for rotating said finder block about said common axis;

a pair of vertical position adjustment mounts formed on said stationary base on opposite sides of said common axis in a front and rear direction of said camera;

a second adjustment mechanism for adjusting a height of one of said pair of vertical position adjustment mounts with respect to a height of the other of said pair of vertical position adjustment mounts which serves as a reference height;

a pair of fixing mounts formed on said stationary base on opposite sides of said common axis in a right and left direction of said camera; and a pair of fixing limbs formed on said finder block which are fixed to said pair of fixing mounts, respectively, after the orientation of said finder block is adjusted via said first adjustment mechanism and said second adjustment mechanism.

2. The parallax adjusting mechanism according to claim 1, wherein said first adjustment mechanism comprises:

an elongated hole formed on one of said pair of fixing limbs, said elongated hole being elongated in a radial direction from said common axis of said pivotal projection and said pivotal recess;

a pivotal hole formed on said stationary base, said pivotal hole corresponding with said elongated hole; and an adjustment jig including a pivotal shank portion and an eccentric shank portion which are engaged in said pivotal hole and said elongated hole, respectively, an axis of said eccentric shank portion being eccentric to an axis of said pivotal shank portion.

3. The parallax adjusting mechanism according to claim 1, wherein one of said vertical position adjustment mounts serves as a reference mount;

wherein the other of said vertical position adjustment mounts serves as an adjustment mount having a height smaller than a height of said reference mount; and wherein said second adjustment mechanism comprises a plurality of spacers of different thicknesses, a spacer being selected from among said plurality of spacers to be inserted between said adjustment mount and said finder block.

4. The parallax adjusting mechanism according to claim 3, further comprising a pivotal mount formed on said stationary base, said pivotal recess being formed on said pivotal mount;

wherein the height of said reference mount is greater than that of said adjustment mount, the height of said adjustment mount is greater than that of each of said pair of fixing mounts, and the height of each of said pair of fixing mounts is greater than that of said pivotal mount.

5. The parallax adjusting mechanism according to claim 4, wherein the heights of said pair of fixing mounts are the same.

6. The parallax adjusting mechanism according to claim 4, further comprising an adjustment jig support mount formed on said stationary base;

wherein said pivotal hole, in which said pivotal shank portion of said adjustment jig is engaged, is formed on said adjustment jig support mount.

7. The parallax adjusting mechanism according to claim 6, wherein the heights of said pivotal mount and said adjustment jig support mount are the same.

8. The parallax adjusting mechanism according to claim 1, wherein said pair of fixing limbs are respectively fixed to said pair of fixing mounts by set screws.

9. The parallax adjusting mechanism according to claim 1, wherein said finder block comprises a channel member and a top cover 15 which covers the top of said channel member, wherein one of said pivotal projection and said pivotal recess is formed on a bottom surface of said channel member.

* * * * *